Inventor
Edgar C. Miller
By his Attorneys
Darby & Darby

Patented Aug. 23, 1932

1,873,008

UNITED STATES PATENT OFFICE

EDGAR C. MILLER, OF PHILADELPHIA, PENNSYLVANIA, ASSIGNOR TO LINK-BELT COMPANY, OF CHICAGO, ILLINOIS, A CORPORATION OF ILLINOIS

LOADING MACHINE

Application filed April 12, 1930. Serial No. 443,643.

The invention relates to loading machines, and particularly to machines of the type disclosed in the copending application of Louis F. Snyder, Serial No. 359,512, filed May 1, 1929, by which bulk material such as coal, sand, gravel, dirt, and the like, is elevated from the ground, or other places of deposit, and delivered to wagons, carts, or other carriers and places.

More particularly the present invention relates to devices for feeding the material to be handled to the elevator, or carrier of loading machines of the nature referred to, by which said material is elevated and delivered.

The object of the invention is to provide a loading apparatus, and more particularly feeding devices therefor, which are simple in structure, economical to manufacture, and efficient in operation.

A further object is to provide feeding devices for loading machines which secure a continuous smooth progression or feed of the material to the elevator without shock or vibration and with reduced expenditure of power for actuating the same.

A further object is to provide in a loading machine of the type in which the machine is continuously advanced towards or into a pile of material to be loaded or transferred, feeding devices which operate to loosen up the material to be handled, and to effect the continuous, uniform, smooth progression of the loosened up material from opposite sides of the elevator into the line of advancement of the elevator, and which is characterized by reduced resistance and the absence of successive impacts or blows, thereby eliminating vibration, and wherein excessive feed of the material by the feeding device is avoided.

Other objects of the invention will appear more fully hereinafter.

The invention consists substantially in the construction, combination, location and relative arrangement of parts, all as will be more fully hereinafter set forth, as illustrated in the accompanying drawings, and finally pointed out in the appended claims.

Referring to the accompanying drawings and to the various views appearing thereon;

Fig. 4 is an enlarged end view of the feeding device forming a part of the machine illustrated by Fig. 1.

The same part is designated by the same reference character wherever it occurs throughout the several views.

Figure 1:
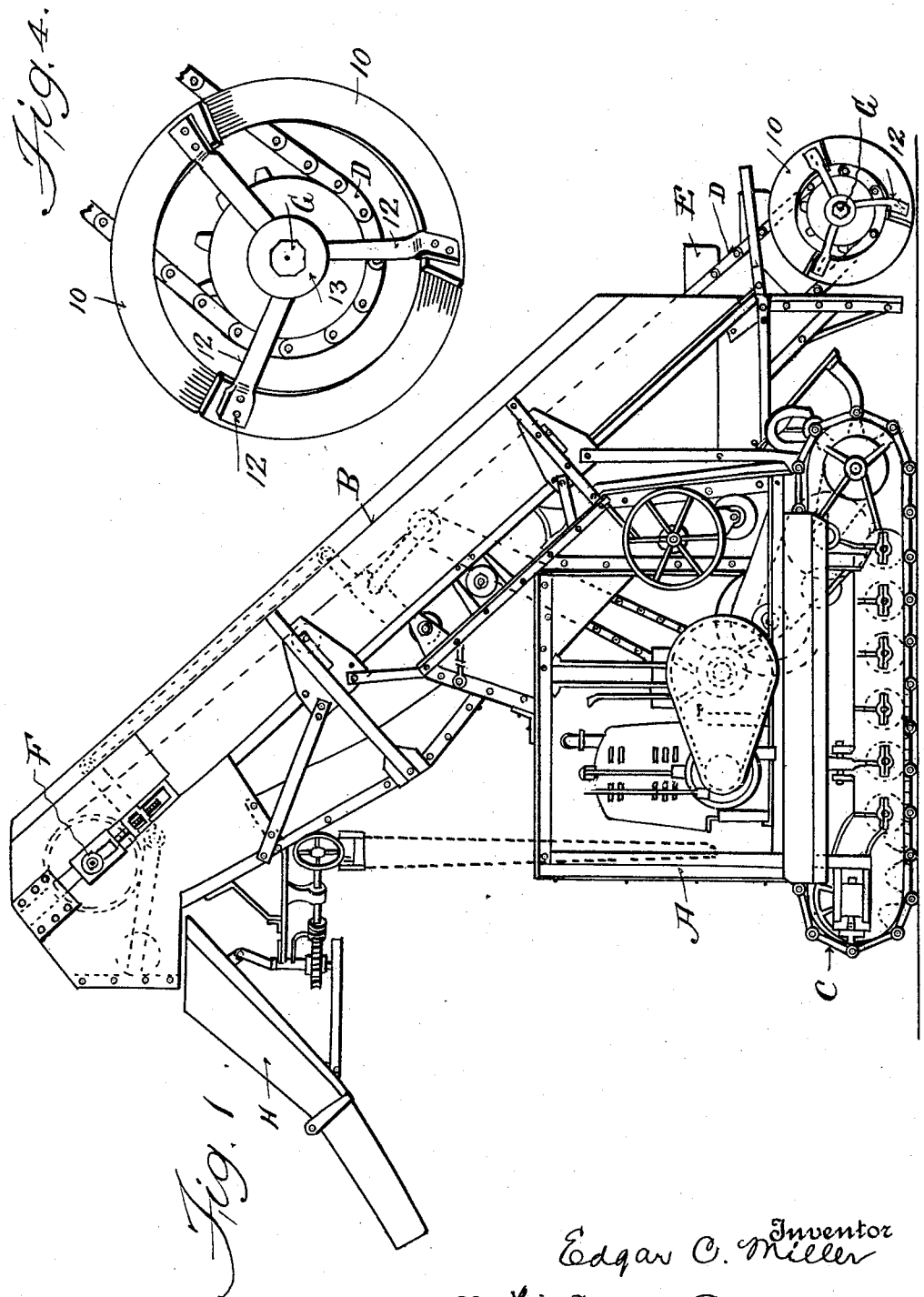
Figure 1 is a side elevation of a loading machine equipped with a feeding device embodying the principles of my invention.

In the handling of various kinds of material, such as coal, sand, gravel, dirt and the like, it is a common practice to employ a delivering conveyor mounted in inclined position upon a suitable framework which is capable of being rocked or tilted vertically to various angles of inclination, and also to be swung into various horizontal positions, and to be advanced towards and from the material to be handled. In connection with such machines it is common to employ feeding devices at the lower front end of the elevating conveyor, and disposed at opposite sides thereof to loosen up and feed the material to be handled into the path of elevating and advancing movement of the conveyor, so as to be scooped up by the conveyor and elevated and loaded into wagons, carts, or the like, or deposited in some other carrier or place.

The present invention relates to apparatus of this same general type and resides more particularly in the structure of feeding devices for loosening up and feeding the material from opposite sides of the conveyor into the path of advancement of the conveyor.

Heretofore it has been a common practice to employ feeders consisting of spirals carried by a foot shaft of the elevating structure, either the lower shaft over which operates the elevating conveyor, or an auxiliary shaft driven therefrom, or otherwise, as desired, the foot shaft being extended beyond one, or both, sides of the elevating conveyor. Spiral feeders of this nature are open to the objection of feeding excessive volumes of the material from opposite sides of the elevator towards the latter, and also to the further objection of encountering an increased resistance due to the large area of contact of the surface of the spiral with the material to be fed, thereby requiring the expenditure of excessive power to effect the rotation of the shaft carrying the spiral feeder. It has also been proposed to employ a series of paddles mounted upon the extended ends of the foot shaft in a spiral line therearound, and having their faces disposed in angular relation thereby forming, in effect, an interrupted spiral type of feeder. Devices of this nature, however, are open to the rather serious objection that the paddles exert successive blows or impacts on the material to be handled, and this not only subjects the structure to an objectionable vibration and jerky action but, also, it results in increased resistance to the rotative action of the feeder, and in the requirement for increased power to effect such rotation, with resultant increase in the strains imposed on the structure.

It is among the special purposes of my present invention to provide feeding devices for use in connection with loading machines of the nature and type referred to which obviate the foregoing and other serious objections and defects in machines of this character.

In carrying out my invention I propose to eliminate entirely the feature of spirally arranged paddles and to employ a continuous form of spiral feeder which is so mounted, constructed and arranged as to accomplish the function of loosening up the material to be fed thereby, and of feeding the loosened material smoothly towards the elevating conveyor, without shock or jar incident to successive impacts or blows, without causing an excessive feed of material, and without requiring excessive power to rotatively actuate the feeders. I also propose, in one form of embodiment of my invention, to employ feeding devices made in separable sections whereby when one section is injured or broken it may be removed and replaced by a new section without necessitating the removal and replacement of the entire feeder. I also propose to employ a feeder of the ribbon type of spiral, that is, a spiral the inner continuous edge of the feeding surface of which is offset radially away from the axis of the shaft upon which it is supported, thereby leaving an open space between the inner radial edge of the spiral and its supporting shaft which will permit a portion of the material to be handled to spill through such space without being engaged and fed toward the elevating conveyor. This avoids an excessive volume of feed of the material and, also, it results in reducing the resistance to the operation of the feeder, and in avoiding the shocks, strains and stresses incident to successive blows or impacts. I also propose to provide the continuous spiral material-feeding surface of the feeder at its outer peripheral edges with a laterally turned edge flange, which serve the purpose of digging into the material to be handled, and of loosening up the same, so that the continuous surface of the web portion of the spiral may exert an efficient, smooth and constant feeding action upon the material to propel the same continuously towards the path of travel of the elevating conveyor.

I also propose to employ a feeder of the ribbon type of spiral in which the material feeding web or blade is not only spiral in general configuration, but also provided with a flat feeding surface positioned at an angle to the perpendicular, the outer edge being advanced as compared with the inner edge in the feeding direction. I contemplate employing a single feeder of this type or a feeder comprising two or more feeding paddles of this nature mounted on radially equally spaced spokes projecting from a common shaft.

In the accompanying drawings, I have shown a main framework A carrying the usual power equipment, and upon which is supported an auxiliary frame B constituting the elevator frame. This elevator frame, in the particular form shown, to which, however, my invention is not to be limited or restricted, is supported upon the main frame A for vertical tilting movement. The main frame is provided with suitable feeding mechanism by which the entire frame may be advanced towards or retracted from the material to be handled. In the particular embodiment shown as illustrative of my invention the main framework is of the crawler type, employing the usual traveling treads C. My invention is not, however, to be limited or restricted in this respect.

The elevator includes endless carriers D, shown in the present instance as having buckets E. The elevator operates over an upper shaft F and a lower or foot shaft G. As the endless carriers D are driven the buckets E carried thereby scoop into the material to be handled which lies in front of them, as they pass around the foot shaft G, thereby picking up and elevating such material to the upper end and over the upper shaft F of the elevating structure, at which point the material is dumped by the buckets into a delivery chute H and thence into a conveniently located wagon, cart, or other carrier.

The features so far described are well known in the art, and of themselves form no part of my present invention, except as the same may form elements of combinations with the features of structure hereinafter to be described. And while I have shown a structure of loading machine of a well known general type, it will be understood, of course, that the feeder devices of my invention are not limited in respect to the use thereof in connection with the particular type of loading machine I have selected for illustrative purposes, as said feeders are equally well applicable to machines of various other general types.

Figure 2:
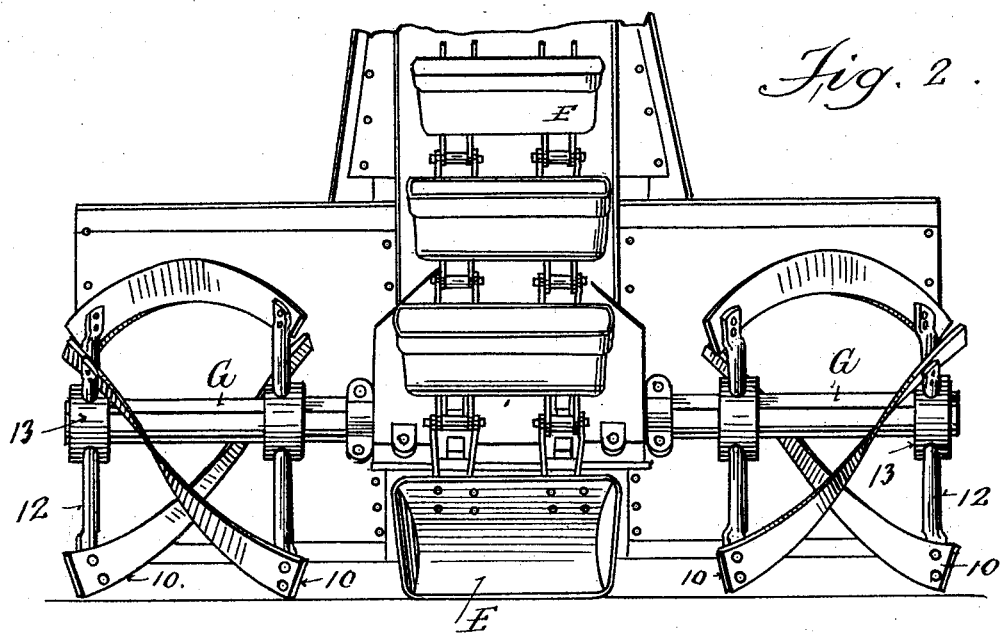
Fig. 2 is a partial front elevation of the feeding device of the machine shown in Fig. 1.
Figure 3:
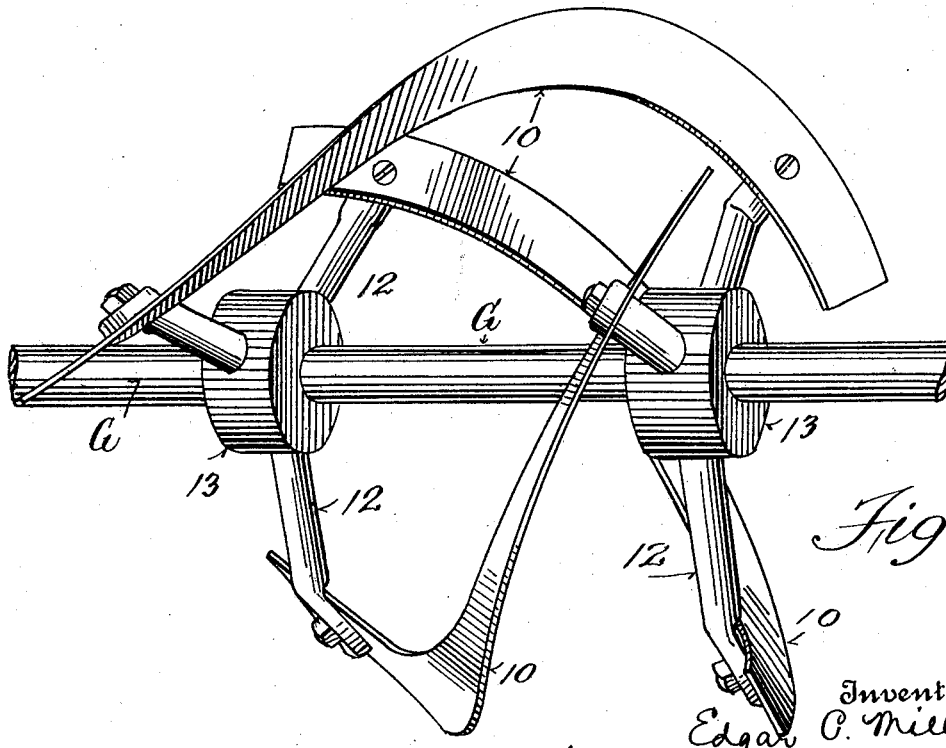
Fig. 3 is a view in perspective of a portion of the feeding device.

The foot shaft G, as clearly shown in Fig. 2, has its ends extended transversely and beyond the sides of the elevator. Upon the extended ends of this shaft are mounted the feeder devices to which my invention is more particularly directed. In the form shown each of these feeder devices comprises a plurality of propellers 10, each in the form of a flat web having a general spiral shape and equipped with radial spokes 12, by means of which it may be clamped to the shaft G through the agency of the clamping members 13 in a position concentric with the shaft. Each feeding web or blade is so mounted upon its spokes that the feeding surface is at an angle to the perpendicular, the outer edge of said blade being advanced as compared with the inner edge in the material feeding direction, in order that the material may not only be fed toward the elevator E, but will also be lifted and loosened somewhat to make the feeding easier. A simple and effective method of mounting the blades as above described is shown in Fig. 3 wherein the outer ends of the spokes are shown as bent or offset to provide for the desired slope of the feeding surfaces with respect to the perpendicular.

In operation, when shaft G is rotated, the outer advanced edge of the propeller first engages with the material to be handled to lift it slightly and loosen it, after which the material is propelled steadily and smoothly by the blade toward the line of travel of the elevating conveyer. The outer edge surface of each feeding web is preferably beveled so that it lies in a horizontal plane and is consequently self-sharpening.

It will also be noted that a space of considerable size is left between the inner edges of the propeller blades and the shaft G, so that if material is supplied to the propeller in excessive quantities it may spill over the inner edge without being propelled toward the elevator. This prevents a too rapid feed of material toward the elevator, avoids choking or retarding the continuous operation of the apparatus, and insures a uniform supply of material to the elevator.

In the drawings, each propeller is illustrated as having three blades. However, as I have previously indicated, the exact number of blades is not material to my invention so long as a plurality of blades are employed since the action may be made smoother and the material transferred toward the elevator with less strain upon the machine by the use of several blades.

It will be observed that no tossing or throwing action more than that of the ordinary spiral conveyor is exerted upon the material tending to throw the same forwardly and towards the line of travel of the elevator. On the contrary, the feeding action exerted on the material is accomplished solely by the continuous radial spiral web surfaces of the feeder sections and is smooth and continuous.

The machine as viewed from the forward end is symmetrical, one or more propellers being similarly positioned upon shaft 12 on either side of the conveyor, the spirals, of course, being reversed in direction and so related to the direction of rotation as to propel the material toward the conveyor. This arrangement clearly appears in Fig. 2.

It will be understood, of course, that the radial web portions of the feeder sections may have any desired degree of spiral, that is, the pitch of the spiral thereof may be of any desired degree. The pitch of the spiral ordinarily depends on the nature of the material to be handled.

It is to be understood that my invention is not limited with respect to the use of the feeders on any particular shaft at the lower end of the elevator.

Having now set forth the objects and nature of my invention, and various structures embodying the principles thereof, what I claim as new and useful and of my own invention and desire to secure by Letters Patent is:

1. A feeding device for loading machines including a rotatable shaft, radial spokes equally positioned therearound and having angular offset outer end portions and a plurality of spiral feeding propellers affixed to said offset portion of said spokes.

2. A feeding device for loading machines including a rotatable shaft, radial spokes equally positioned therearound and having angular offset outer end portions and a plurality of spiral feeding propellers affixed to said offset portion of said spokes, each of said propellers being in the same relative position with respect to said shaft and to each other.

3. A feeding device for loading machines including a rotatable shaft, radial spokes equally positioned therearound and having angular offset outer end portions and a plurality of spiral feeding propellers affixed to said offset portion of said spokes so that the outer edges thereof are in advance of the inner edges with respect to the direction of material propulsion.

In testimony whereof I have hereunto set my hand on this 31st day of March, A. D. 1930.

EDGAR C. MILLER.